United States Patent [19]

Wood

[11] Patent Number: 4,965,024

[45] Date of Patent: Oct. 23, 1990

[54] PRODUCTION OF CERAMIC NUCLEAR FUEL PELLETS

[75] Inventor: Geoffrey A. Wood, Preston, United Kingdom

[73] Assignee: British Nuclear Fuels plc, Warrington, England

[21] Appl. No.: 257,964

[22] Filed: Oct. 14, 1988

[30] Foreign Application Priority Data

Oct. 20, 1987 [GB] United Kingdom ............... 8724514

[51] Int. Cl.$^5$ ............................................. C21C 21/00
[52] U.S. Cl. ...................................... 264/0.5; 423/261
[58] Field of Search ......................... 423/261; 264/0.5

[56] References Cited

U.S. PATENT DOCUMENTS

| | | | |
|---|---|---|---|
| 3,978,194 | 8/1976 | Knudsen et al. | 423/261 |
| 4,020,146 | 4/1977 | Knudsen | 423/261 |
| 4,512,939 | 4/1985 | Dörr et al. | 264/0.5 |
| 4,562,017 | 12/1985 | Hrovat et al. | 264/0.5 |
| 4,617,158 | 10/1986 | Braun et al. | 264/0.5 |
| 4,637,900 | 1/1987 | Frederickson | 252/643 |
| 4,643,873 | 2/1987 | Hayes | 423/261 X |
| 4,830,841 | 5/1989 | Urza | 423/261 |

FOREIGN PATENT DOCUMENTS

| | | |
|---|---|---|
| 1375371 | 8/1971 | United Kingdom . |
| 1320137 | 6/1973 | United Kingdom . |
| 1461263 | 1/1976 | United Kingdom . |
| 1461264 | 1/1977 | United Kingdom . |
| 2056155 | 5/1979 | United Kingdom . |
| 2032899 | 5/1980 | United Kingdom . |
| 2064503A | 6/1981 | United Kingdom . |
| 2177249A | 1/1987 | United Kingdom . |

*Primary Examiner*—Edward A. Miller
*Assistant Examiner*—Ngoclan T. Mai
*Attorney, Agent, or Firm*—William R. Hinds

[57] ABSTRACT

Uranium dioxide nuclear fuel pellets are produced using a ceramic grade uranium dioxide powder derived from the reaction of uranium hexafluoride with steam and hydrogen. The powder is pelletized and the green pellets are transported through a furnace and subjected to fast-fired sintering typically at temperature of the order of 2000–2200° C. and for a time interval between 50 to 500 seconds. It has been found that fast-fired sintering of such powders under these conditions enables densities of the order of 95% theoretical density to be achieved, with resinter density changes of the order of 2% and lower, without requiring any mechanical compression of the hot pellets. The inclusion of seed crystals of uranium dioxide in the pelletized powder increases the grain size of the fuel pellets.

21 Claims, No Drawings

PRODUCTION OF CERAMIC NUCLEAR FUEL PELLETS

This invention relates to the production of ceramic nuclear fuel pellets.

According to the present invention in a method of producing ceramic nuclear fuel pellets said method comprising forming green pellets comprising uranium dioxide powder, and introducing the pellets into a heating zone in which they are subjected to fast-filing, for sintering the pellets the powder comprises a ceramic grade powder having a specific surface area of at least 1 $m^2g^{-1}$ and derived from the reaction of uranium hexafluoride with steam and hydrogen, and the fast-fired sintering is performed at a sintering temperature of at least 1900° C., whereby densification above 90% theoretical density is achievable solely by sintering.

We are aware of U.S. Pat. No. 4,562,017 which discloses the production of ceramic fuel pellets, containing fissile and/or fertile material in oxide form, by heating green pre-molded pellets of $UO_2$ or $UO_2/PuO_2$ powders to temperatures up to 2500° C. in a helium-hydrogen atmosphere, firstly to 1200° C. at a rate less than 30° C. per second and subsequently above 1200° C. at a rate greater than 30° C. per second, and rapidly transferring the heated pellets into a die in which they are compressed to desired dimensions within a few milliseconds and then ejected. The patent recommends the use of powder having the smallest possible sintering activity and specifically refers to ground sintered scrap and a powder produced through thermal decomposition of uranyl nitrate or uranyl nitrate-plutonium nitrate.

The present invention, by contrast, employs a ceramic grade powder derived from the reaction of uranium hexafluoride with steam and hydrogen. With such a powder it has been found possible to achieve, by fast firing, pellet densities well in excess of 90% theoretical density (TD) without resorting to the complication of die pressing the heated pellets, i.e. densification is achieved solely by sintering.

The powder employed in the present invention may incorporate an additive or additives; for example a fugitive pore former such as ammonium oxalate (as described in our prior British Patents Nos. 1461263 and 1461264 to which reference should be made for further details). The additive may comprise a plutonium oxide (for example in an amount of the order of 20% by weight) having suitable ceramic properties amenable to fast firing to achieve sintered pellet densities above 90% TD without the need for die pressing of the hot pellets.

The green pellets may include seed crystals which are essentially single crystals and may comprise uranium dioxide. The fast-fired sintering may be carried out within a temperature range of 1900° C.–2500° C., preferably 2000° C.–2200° C., for an interval of time which is no greater than 10 minutes, preferably between 50 seconds and 500 seconds and typically 200–500 seconds.

In conventional processes for the production of nuclear fuel pellets using powder derived from the reaction of uranium hexafluoride with steam and hydrogen, the sintering process is carried out at about 1700° C. for 3–4 hours or longer.

In accordance with the present invention the sintering process is executed much more rapidly, e.g. less than 10 minutes compared with 3-4 hours, the temperature and time for sintering being selected such that the end product is sintered to a density above 90% TD, preferably at least 94% TD, and such that the density change on resintering the sintered pellets at 1700° C. for 24 hours in a hydrogen atmosphere is of the order of 2% or less, preferably no greater than 1%.

The fast firing step may be carried out in vacuo or in a non-oxidising atmosphere—for example a reducing environment. The reducing atmosphere may be a hydrogen-containing atmosphere which preferably contains some moisture—for example 99% hydrogen and 1% moisture which may be generated by addition of $CO_2$ in the hydrogen-containing atmosphere.

The fast firing may be carried while the pellets are transported through a furnace, e.g. continuously, or may be carried out in a batch furnace.

The starting powder employed in the method of the invention is preferably derived by the process described in our prior British Patent Nos. 1320137 or 2064503, the disclosures of which are incorporated herein by this reference. The starting powder preferably has a specific surface area of between 2 and 3 $m^2g^{-1}$.

Where the $UO_2$ starting powder is combined with a fugitive pore former, such as ammonium oxalate (typically in an amount of the order of up to 1% by weight) or a lubricant to aid pressing of the green pellets, the pellets may be pre-heated slowly at relatively lower temperatures e.g. 250° C.–800° C. depending on the properties of the lubricant to decompose and drive off the pore former or lubricant before being subjected to fast firing at temperatures of at least 1900° C. at a rate of up to 1300° C. $min^{-1}$.

In many cases such a pre-treatment will be unnecessary, and the rate of heating might be from 300° C. $min^{-1}$ up to 700° C. $min^{-1}$, for example in temperature ranges of between 300° and 400° C. $min^{-1}$, or 600° and 700° C. $min^{-1}$. When the fast firing process is carried out by transporting the pellets continuously through an oven in which the temperature is maintained at least at 1900° C., typically 2000° C.–2200° C., the rate of travel of the pellets is such that the time during which the pellets are exposed to the fast firing temperature in the hot zone of the oven is sufficient to achieve a density above 90% TD and a density change on resintering, under the previously stated conditions of the order of 2%, and more preferably 1%.

In experimental work carried out, a $UO_2$ powder derived from the reaction of $UF_6$ with steam and hydrogen was granulated and pressed at pressures of 3.1 tonnes $cm^{-2}$, with die wall lubrication, to produce green pellets. The pellets were rapidly heated from room temperature to various sintering temperatures at a rate of 300°–400° C. $min^{-1}$ and maintained at the selected sintering temperature for 200 seconds in each instance.

The following densities were obtained:

| Sintering Temp °C. | Density (% TD) | Resinter Density (% TD) | Density change on resinter (% TD) |
|---|---|---|---|
| 1700 | 95.4 | 99.3 | 3.9 |
| 1800 | 96.7 | 99.3 | 2.6 |
| 1900 | 97.3 | 99.4 | 2.1 |
| 2000 | 97.8 | 99.2 | 1.4 |
| 2100 | 98.1 | 99.0 | 0.9 |

It can be seen that at a sintering temperature of 1900° C., the density change on resinter was of the order of 2% TD (in fact 2.1% TD) which is an acceptable level for some applications.

Seeding of the green pellets might have advantages, for example to increase grain size as described in the following Example.

EXAMPLE

Precursor green pellets (about 11 mm diameter × 11 mm long) of uranium dioxide were heated to 2100° C. at 20° C. min$^{-1}$ in a dry hydrogen environment, and held at this temperature for one hour. The pellets were then cooled at 20° C. min$^{-1}$ between 2100° C. and 450° C. and subsequently allowed to cool naturally to ambient temperature. During cooling the pellets disintegrated into a powder which was sieved, and fractions less than 37 microns were retained—essentially single crystal seeds. The seeds were added to a matrix uranium dioxide powder at 2% and 5% level (e.g. 2 g seeds and 98 g matrix powder). The resulting mixed powder was granulated and the granules pressed into pellets using die wall lubrication at 4 tonnes cm$^{-2}$.

The pellets were fast fired from ambient temperature to a sintering temperature of about 2100° C. in a reducing environment—hydrogen +1% $CO_2$. The rate of heating was between 600° C. min$^{-1}$ and 700° C.$^{-1}$. The pellets were held at the sintering temperature for between 0 and 500 seconds and then rapidly cooled between 2100° C. and 1600° C. at a rate between 850° C. and 1000° C. min$^{-1}$. The results obtained are displayed in the following Table:

| Run | Time (secs) at 2100° C. | Seed Content % | Density (% TD) | Grain Size (microns) | Change in density on resinter (% TD) |
|---|---|---|---|---|---|
| 1 | 0 (immediate cooling) | 0 | 97.03 | 5.8 | +2.30 |
|   |   | 2 | 96.43 | 5.8 | +2.02 |
|   |   | 5 | 95.39 | 5.1 | +2.03 |
| 2 | 50 | 0 | 97.76 | 8.3 | +1.54 |
|   |   | 2 | 97.13 | 9.7 | +1.31 |
|   |   | 5 | 95.76 | 9.9 | +1.30 |
| 3 | 200 | 0 | 98.40 | 12.3 | +0.92 |
|   |   | 2 | 97.72 | 14.1 | +0.59 |
|   |   | 5 | 96.47 | 18.4 | +0.59 |
| 4 | 500 | 0 | 98.73 | 16.6 | +0.49 |
|   |   | 2 | 97.93 | 22.8 | +0.36 |
|   |   | 5 | 96.66 | 23.8 | +0.37 |

Densities were obtained by an immersion technique using water as the liquid.

Grain sizes were established by the ASTM mean linear intercept method.

Resintering took place at 1700° C. in a hydrogen environment for 24 hours to assess thermal stability of the fast fired material.

The advantages from the use of seed crystals are apparent from the Table, particularly in run 3 and 4 where relatively large grain sizes were obtained.

Further information relating to the use of seed crystals may be obtained from British Patent Specification No. 2177249A.

I claim:

1. A method of producing ceramic nuclear fuel pellets, said method comprising forming green pellets comprising uranium dioxide powder, and introducing the pellets into a heating zone for sintering the pellets, wherein the improvement comprises, the powder comprises a ceramic grade powder having a specific surface area of at least 1 m$^2$g$^{-1}$ and is derived from the reaction of uranium hexafluoride with steam and hydrogen, and the sintering comprises heating the green pellets at a rate of up to 1300° C. min$^{-1}$ to a temperature of at least 1900 C and sintering at said temperature of at least 1900° C. for a period between 50 seconds and 10 minutes, whereby a densification above 96% theoretical density is achieved by said sintering.

2. A method as claimed in claim 1, wherein the uranium dioxide powder is combined with an additive.

3. A method as claimed in claim 2, wherein the additive comprises plutonium dioxide.

4. A method as claimed in claim 1, wherein the sintering is carried out within the temperature range of 1900° C.-2500° C.

5. A method as claimed in claim 4, wherein the sintering is carried out within the temperature range 2000° C.—2200° C.

6. A method as claimed in claim 5, wherein the uranium dioxide powder has a specific surface area between 2 and 3 m$^2$g$^{-1}$.

7. A method as claimed in claim 5, wherein the sintering is carried out for an interval between 50 seconds and 500 seconds.

8. A method as claimed in claim 7, wherein the sintering is carried out for an interval between 200 and 500 seconds.

9. A method as claimed in claim 4, wherein the rate of heating the green pellets is between 300° C. min$^{-1}$ to 1300° C. min$^{-1}$.

10. A method as claimed in claim 9, wherein the rate of heating is between 300° C. and 400° C. min$^{-1}$.

11. A method as claimed in claim 5, wherein the rate of heating the green pellets is between 600° C. and 700° C. min$^{-1}$.

12. A method as claimed in claim 9 wherein the green pellets are pre-heated slowly at between 250° C. and 850° C. to decompose and drive off any fugitive pore former and lubricant therein, before heating to sintering temperature takes place.

13. A method as claimed in claim 1, wherein the green pellets include seeds which comprise essentially single cyrstals.

14. A method as claimed in claim 13, wherein the single crystals comprise uranium dioxide.

15. A method as claimed in claim 14, wherein the seed crystals are formed by heating green precursors comprising uranium dioxide to about 2100° C. in a reducing environment and holding the precursor pellets at that temperature for about one hour, disintegrating the precursor pellets by cooling the precursor pellets at about 20° C. min$^{-1}$ between 2100° C. and 450° C. and then naturally from 450° C. to ambient temperature, and selecting seeds from the disintegrated pellets comprising essentially single crystals of less than 37 microns.

16. A method as claimed in claim 15, including mixing the seeds with a matrix powder comprising uranium dioxide to form the green pellets therefrom.

17. A method as claimed in claim 14, wherein the seeds comprise between 2% and 5% by weight of the green pellets.

18. A method as claimed in claim 1, wherein after sintering the pellets are rapidly cooled.

19. A method as claimed in claim 18, wherein the pellets are cooled between 2100° C. and 1600° C. at a rate between 850° and 1000° C. min$^{-1}$.

20. A method as claimed in claim 1, wherein sintering is effected by moving the pellets continuously through the heating zone.

21. A method of producing ceramic nuclear fuel pellets comprising:
- a. mixing ceramic grade uranium dioxide powder with essentially single crystals comprising uranium dioxide, the powder having a specific surface area of between 2 and 3 m$^2$g$^{-1}$, and the crystals having a particle size less than 37 microns and being between 2% and 5% by weight in the mixture;
- b. forming granules from the mixture and pressing the granules to form pellets;
- c. heating the pellets to a sintering temperature of between 2000° C. and 2200° C. in a reducing environment comprising hydrogen and at a rate of heating between 600° C. and 700° C. min$^{-1}$;
- d. holding the pellets at the sintering temperature for between 200 and 500 seconds, and
- e. rapidly cooling the sintered pellets between 2100° C. and 1600° C. at a rate between 850° C. and 1000° C. min$^{-1}$, whereby a densification above 96% theoretical density is achieved by said sintering.

* * * * *